(12) United States Patent
Lee et al.

(10) Patent No.: US 11,356,511 B2
(45) Date of Patent: Jun. 7, 2022

(54) ELECTRONIC DEVICE AND METHOD FOR CONTROLLING THEREOF

(71) Applicant: SAMSUNG ELECTRONICS CO., LTD., Suwon-si (KR)

(72) Inventors: Sungho Lee, Suwon-si (KR); Jungwon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/123,696

(22) Filed: Dec. 16, 2020

(65) Prior Publication Data
US 2021/0258382 A1     Aug. 19, 2021

(30) Foreign Application Priority Data
Feb. 19, 2020 (KR) .................. 10-2020-0020475

(51) Int. Cl.
*H04L 29/08* (2006.01)
*H04L 29/06* (2006.01)
(Continued)

(52) U.S. Cl.
CPC .............. *H04L 67/12* (2013.01); *H04L 45/24* (2013.01); *H04L 65/60* (2013.01);
(Continued)

(58) Field of Classification Search
CPC ......... H04L 67/12; H04L 67/18; H04L 45/24; H04L 45/123; H04L 45/12; H04L 45/125;
(Continued)

(56) References Cited

U.S. PATENT DOCUMENTS

| 6,320,518 B2 | 11/2001 | Saeki et al. |
| 6,892,132 B2 | 5/2005 | Nagamune |

(Continued)

FOREIGN PATENT DOCUMENTS

| JP | 3475142 | 9/2003 |
| JP | 4688198 | 2/2011 |

(Continued)

OTHER PUBLICATIONS

International Search Report and Written Opinion dated May 20, 2021 in corresponding International Application No. PCT/KR2021/000885.

*Primary Examiner* — David R Lazaro
(74) *Attorney, Agent, or Firm* — Nixon & Vanderhye, P.C.

(57) ABSTRACT

An electronic device mountable on an autonomous driving vehicle and a method for controlling the same are provided. The electronic device of the disclosure includes: a communicator including circuitry, a memory, and a processor configured to: control the electronic device to receive metadata for map streaming from a server via the communicator based on at least one communication method, determine at least one type of data to be received from the server among a plurality of types of data included in the metadata based on state information of the vehicle and a bandwidth of the at least one communication method, and control the electronic device to receive and provide the determined at least one type of data from the server via the communicator.

20 Claims, 9 Drawing Sheets

(51) Int. Cl.
*H04L 12/707* (2013.01)
*H04W 4/44* (2018.01)
*H04W 48/18* (2009.01)
*H04L 67/12* (2022.01)
*H04L 65/60* (2022.01)
*H04L 67/1001* (2022.01)
*H04L 45/24* (2022.01)

(52) U.S. Cl.
CPC ........... *H04L 67/1002* (2013.01); *H04W 4/44* (2018.02); *H04W 48/18* (2013.01)

(58) Field of Classification Search
CPC .......... H04L 45/22; H04L 65/60; H04W 4/40; H04W 4/44; H04W 40/12; H04W 76/15; H04W 4/46; G01C 21/26; G01C 21/3691; G01C 21/3492; G01C 21/3667; G01C 21/3453; G01C 21/3694; G01C 21/3885; G01C 21/3889; G01C 21/3893; G01C 21/3896; G01C 21/387; G01C 21/3874; G01C 21/3878; G01C 21/3881; G01C 21/367; G01C 21/3673; G01C 21/3676; G01C 21/3679; G01C 21/3682
See application file for complete search history.

(56) References Cited

U.S. PATENT DOCUMENTS

| | | | |
|---|---|---|---|
| 8,140,358 B1* | 3/2012 | Ling | G07C 5/008 705/4 |
| 11,109,308 B2* | 8/2021 | Barany | H04W 4/40 |
| 2001/0019309 A1 | 9/2001 | Saeki et al. | |
| 2003/0028317 A1 | 2/2003 | Nagamune | |
| 2007/0233371 A1* | 10/2007 | Stoschek | G08G 1/0969 701/533 |
| 2014/0274009 A1* | 9/2014 | Do | H04W 52/0209 455/418 |
| 2015/0100229 A1* | 4/2015 | Zhao | G01C 21/34 701/400 |
| 2016/0091321 A1* | 3/2016 | Chintakindi | G08G 1/096775 701/117 |
| 2016/0191861 A1* | 6/2016 | Tinskey | H04L 65/4092 348/148 |
| 2017/0122749 A1 | 5/2017 | Urano et al. | |
| 2017/0164257 A1 | 6/2017 | Ross et al. | |
| 2017/0332274 A1* | 11/2017 | Link, II | H04W 36/0033 |
| 2018/0137692 A1* | 5/2018 | Ohmert | G07C 5/008 |
| 2018/0188044 A1 | 7/2018 | Wheeler | |
| 2018/0376357 A1* | 12/2018 | Tavares Coutinho | H04L 67/10 |
| 2019/0190703 A1* | 6/2019 | Lekkas | H04L 63/00 |
| 2019/0204076 A1 | 7/2019 | Nishi et al. | |
| 2019/0236955 A1* | 8/2019 | Hu | G08G 1/096844 |
| 2019/0265045 A1 | 8/2019 | Baik et al. | |
| 2020/0008122 A1* | 1/2020 | Radko | H04W 76/34 |
| 2020/0033147 A1 | 1/2020 | Ahn | |
| 2020/0053577 A1* | 2/2020 | Sundar | H04W 4/44 |
| 2020/0073966 A1* | 3/2020 | Fowe | G01C 21/3691 |
| 2020/0077328 A1* | 3/2020 | Barany | H04M 15/8044 |
| 2020/0098258 A1* | 3/2020 | Morris | G08G 1/096822 |
| 2020/0153926 A1* | 5/2020 | Slater | G08C 13/00 |
| 2020/0217670 A1* | 7/2020 | Paoletti | G01C 21/3881 |
| 2020/0412811 A1* | 12/2020 | Campbell | H04L 65/4084 |
| 2021/0258382 A1* | 8/2021 | Lee | H04L 67/1002 |

FOREIGN PATENT DOCUMENTS

| | | |
|---|---|---|
| JP | 2019-40176 | 3/2019 |
| KR | 10-0723674 | 5/2007 |
| KR | 10-1880168 | 7/2018 |
| KR | 10-2019-0056491 | 5/2019 |
| KR | 10-2019-0101925 | 9/2019 |
| KR | 10-2019-0109625 | 9/2019 |

* cited by examiner

ELECTRONIC DEVICE AND METHOD FOR CONTROLLING THEREOF

CROSS-REFERENCE TO RELATED APPLICATION

This application is based on and claims priority under 35 U.S.C. § 119 to Korean Patent Application No. 10-2020-0020475, filed on Feb. 19, 2020, in the Korean Intellectual Property Office, the disclosure of which is incorporated by reference herein in its entirety.

BACKGROUND

1. Field

The disclosure relates to an electronic device and a method for controlling thereof. For example, the disclosure relates to an electronic device for providing a high definition map for autonomous driving based on received data using an adaptive streaming method and a method for controlling thereof.

2. Description of Related Art

Since an autonomous driving vehicle depends on a high definition map for driving, various technologies have been developed to produce and update maps with higher definition.

In the related art, a technology of downloading a map in a cloud-based network communication environment has been utilized and developed in order to download a high definition map. In addition, a technology of a map downloading method of a commercially available navigation system for downloading an entire file of a map necessary for driving of an autonomous driving vehicle and then partially updating a map based on position information of the vehicle has been utilized.

However, if a large amount of data including the high definition map is downloaded using the method of the related art, buffering with a threshold value or more may occur and low-quality data may be downloaded. In addition, the map downloading method of the commercially available navigation system is designed for a driver to handle various problems by himself/herself, and accordingly, it is hard to apply this method to the autonomous driving vehicle.

The above information is presented as background information only to assist with an understanding of the disclosure. No determination has been made, and no assertion is made, as to whether any of the above might be applicable as prior art with regard to the disclosure.

SUMMARY

In accordance with an example embodiment of the disclosure, there is provided an electronic device mountable on an autonomous driving vehicle, the device including: a communicator including circuitry, a memory, and a processor configured to: control the electronic device to receive metadata for map streaming from at least one server via the communicator based on at least one communication method, determine at least one type of data to be received from the at least one server among a plurality of types of data included in the metadata based on state information of the vehicle and a bandwidth of the at least one communication method, and to control the electronic device to receive and provide the determined at least one type of data from the at least one server via the communicator.

In accordance with another example embodiment of the disclosure, there is provided a method for controlling an electronic device mountable on an autonomous driving vehicle, the method including: receiving metadata for map streaming from at least one server based on at least one communication method, determining at least one type of data to be received from the at least one server among a plurality of types of data included in the metadata based on state information of the vehicle and a bandwidth of the at least one communication method, and receiving and providing the determined at least one type of data from the at least one server.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

The disclosure has been made to address the above problems and the disclosure provides an electronic device for receiving and providing data for map streaming based on at least one communication method and state information of a vehicle and a method for controlling thereof.

The disclosure relates to an electronic device 100 capable of receiving at least one type of data for map streaming using an adaptive streaming method and being mounted on an autonomous driving vehicle, for which the received data is provided, and a method for controlling thereof. The electronic device 100 may be manufactured as a separate device to be connected to the inside of a vehicle, but this is merely an example embodiment and the electronic device 100 may be built in the vehicle.

Examples of the vehicle on which the electronic device 100 described in the disclosure is to be mounted include a car, a truck, a motorcycle, a bus, and the like. In addition, the vehicle described in the disclosure may include all of an internal combustion engine vehicle including an engine as a power source, a hybrid vehicle including an engine and an electric motor as power sources, an electric vehicle including an electric motor as a power source, and the like. In addition, the vehicle may be an autonomous vehicle or an unmanned vehicle (driverless car) capable of driving by itself by recognizing a driving environment and controlling the vehicle without manipulation of a driver, but this is merely an example, and the vehicle may be a manually operated vehicle that is driven by a driver's manipulation or a vehicle with a combination of manual manipulation and autonomous driving method.

Hereinafter, various embodiments according to the disclosure will be described in greater detail with reference to the accompanying drawings.

Figure 1:
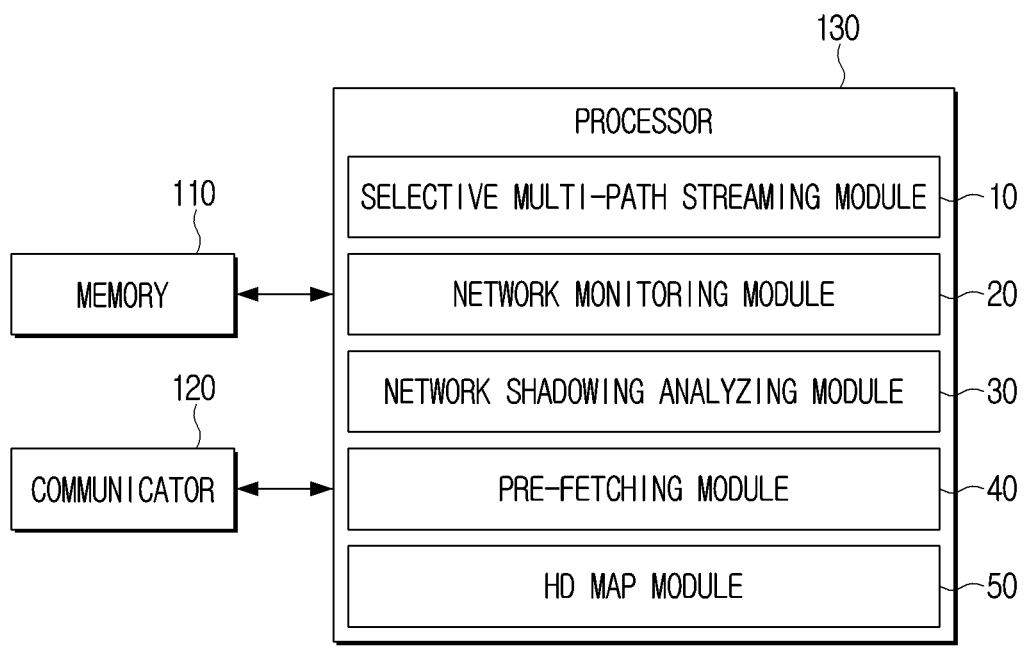
FIG. 1 is a block diagram illustrating an example configuration of an electronic device according to various embodiments.

FIG. 1 is a block diagram illustrating an example configuration of an electronic device 100 capable of being mounted on an autonomous driving vehicle according to an embodiment. Referring to FIG. 1, the electronic device 100 may include a memory 110, a communicator (e.g., including communication circuitry) 120, and a processor (e.g., including processing circuitry) 130. However, the configuration illustrated in FIG. 1 is merely an example and suitable hardware and/or software configurations apparent to those skilled in the art may be additionally included in the electronic device 100.

The memory 110 may store an instruction or data related to at least another element of the electronic device 100. For example, the memory 110 may be implemented as a non-volatile memory (e.g., dynamic random-access memory (RAM) and a static RAM (SRAM)), a volatile memory (flash memory), a programmable read-only memory (PROM), a magnetoresistive random-access memory (MRAM), and a resistive RAM (RRAM), a hard disk drive (HDD), or a solid state drive (SSD). The volatile memory may refer to a memory that needs continuous power supply to hold the stored information, and the non-volatile memory may refer to a memory holding stored information, even if the power supply is interrupted.

The memory 110 may be accessed by the processor 130 and reading, recording, editing, deleting, or updating of the data by the processor 130 may be executed. A term, memory, in the disclosure may include the memory 110, a ROM (not illustrated) and RAM (not illustrated) in the processor 130, or a memory card (not illustrated) (e.g., micro SD card or memory stick) mounted on the electronic device 100. In addition, the memory 110 may store a program, data, and the like for configuring various screens to be displayed on a display region of a display 140.

For example, the memory 110 may store a dialogue system which may refer, for example, to an artificial intelligence model for providing a response to an input user voice. The dialogue system may be stored in the non-volatile memory, and if a trigger word or the like is input, the dialogue system may be loaded to the volatile memory and activated under the control of the processor 130.

The communicator 120 may include various communication circuitry and communicate with a server or an external device. The communication connection of the communicator 120 with the external device may include communication via a third device (e.g., a repeater, a hub, an access point, a server, a gateway, or the like).

For example, the communicator 120 may include various communication modules for communicating with a server or an external device. In an example, the communicator 120 may include various modules, each including various communication circuitry, such as, for example, wireless communication modules and, for example, include a cellular communication module using at least one of LTE, LTE Advance (LTE-A), code division multiple access (CDMA), wideband CDMA (WCDMA), $5^{th}$ generation (5G), universal mobile telecommunications system (UMTS), Wireless Broadband (WiBro), or global system for mobile communications (GSM). In another example, the wireless communication module may, for example, include at least one of wireless fidelity (Wi-Fi), Bluetooth, Bluetooth Low Energy (BLE), Zigbee, near field communication (NFC), magnetic secure transmission, radio frequency (RF), or body area network (BAN).

The communicator 120 may select at least one of a plurality of communication modules, and communicate with at least one server or external device by a communication method using the selected at least one communication module under the control of the processor 130. For example, when a Wi-Fi module and an LTE-A module are selected under the control of the processor 130, the communicator 120 may communicate with at least one server for providing metadata for map streaming by a communication method using the Wi-Fi module and the LTE-A module. At least one server may store metadata necessary for map streaming and a plurality of types of data to be obtained by the processor 130 through the metadata. Accordingly, the communicator 120 may communicate with at least one server by various communication methods and receive data under the control of the processor 130.

In an embodiment, the communicator 120 may receive data from at least one server by a multi-connected method using the selected at least one communication method under the control of the processor 130. In other words, the communicator 120 may communicate with one server via a plurality of communication methods and receive a plurality of types of data in parallel from the one server by each connected communication method. In an example, the communicator 120 may communicate with one server using the Wi-Fi module and the LTE-A module and receive a plurality of types of data in parallel from the one server by a communication method connected via each module.

In another example, the communicator 120 may receive data from at least one server by a multi-path method using the selected at least one communication method under the control of the processor 130. In other words, the communicator 120 may communicate with each of a plurality of servers using a plurality of communication methods and receive data in parallel through the communication method connected to each server. For example, the communicator 120 may communicate with a first server using the Wi-Fi module and communicate with a second server using the LTE-A module. The communicator 120 may receive data from the first server by the Wi-Fi method and receive data from the second server by the LTE-A method.

Accordingly, the communicator 120 may communicate with at least one server by multi connection or multi methods based on the selected at least one communication method under the control of the processor 130 and receive metadata for map streaming and a plurality of types of data included in the metadata through each connection method.

In an embodiment, the communicator 120 may receive various pieces of shared data (e.g., information regarding a shadowing area included in a route of a vehicle traveling in front or at the back of the vehicle on which the electronic device 100 is mounted, and the like) from a vehicle traveling in front or at the back of the vehicle on which the electronic device 100 is mounted. In addition, the communicator 120 may receive various pieces of data using a vehicular ad-hoc network or a Vehicle to Infra (V2I) technology.

The processor 130 may include various processing circuitry and be electrically connected to the memory 120 to perform general operations of the electronic device 100. For example, the processor 130 may load a plurality of modules stored in the memory and execute the loaded modules to perform general functions of the electronic device 100. Referring to FIG. 1, the processor 130 may load a selective multi-path streaming module (e.g., including various processing circuitry and/or executable program elements) 10, a network monitoring module (e.g., including various processing circuitry and/or executable program elements) 20, a network shadowing analyzing module (e.g., including various processing circuitry and/or executable program elements) 30, a pre-fetching module (e.g., including various processing circuitry and/or executable program elements) 40, and a high definition (HD) map module (e.g., including various processing circuitry and/or executable program elements) 50 from the non-volatile memory. In other words, each module is stored in the non-volatile memory and loaded to the volatile memory under the control of the processor 130. Referring to FIG. 1, the volatile memory may be an element of the processor 130 and may be implemented to be included in the processor 130, but this is merely an example, and the volatile memory may be implemented as an element separated from the processor 130.

The processor 130 may receive metadata for map streaming from a server via the communicator 120 based on at least one communication method. In an embodiment, when a destination of the vehicle on which the electronic device 100 is mounted is determined, the processor 130 may receive metadata corresponding to a starting point to an arrival point from the at least one server via the communicator 120 based on the at least one communication method. In an embodiment, the processor 130 may receive metadata periodically from the at least one server via the communicator 120. In an embodiment, when a predetermined event (e.g., changing of a driving route, updating data in a server, or the like) occurs, the processor 130 may receive metadata again from the at least one server via the communicator 120. In other words, the processor 130 may receive the metadata not only once, but periodically or repeatedly from the at least one server.

The processor 130 may select at least one communication method among a plurality of communication methods through the selective multi-path streaming module 10 based on at least one of a bandwidth and a speed of the communication method, and a cost of each communication method. In an embodiment, the processor 130 may apply different weight values (or values for setting a priority order) to a bandwidth, a speed, and a cost of each of the plurality of communication methods through the selective multi-path streaming module 10. The processor 130 may obtain a sum of weight values of the communication method usable by the communicator 120 in real time at a position where the vehicle on which the electronic device 100 is mounted is currently positioned. The processor 130 may select a communication method with a largest sum from among the obtained sums of the weight values and receive metadata from the server via the communicator 120 based on the selected communication method. For example, if a specific communication method has a largest bandwidth, a highest speed, and lowest cost among the plurality of communication methods, a sum of the weight values of the specific communication method may be the largest.

The processor 130 may select one communication method based on the sum of the weight values, but this is merely an example, and two or more communication methods may be selected in order of the largest sum of the weight values to use multi connection or multi-path method. For example, when the Wi-Fi method and the LTE-A method are selected, the processor 130 may receive data from one server in parallel using the selected communication methods or receive data from each of different servers by the selected communication methods. The weight values for each of the bandwidth and the speed of the communication method and the cost of each communication method may be set differently. Accordingly, the processor 130 may select at least one communication method among the plurality of communication methods based on an element preferentially considered by a user.

The processor 130 may monitor the bandwidth of the selected at least one communication method through the network monitoring module 20. For example, the bandwidth of the selected at least one communication method is reduced by a predetermined value or more, the processor 130 may select a new communication method among the plurality of communication methods to communicate with at least one server. In other words, the processor 130 may monitor a state of the bandwidth of the communication method currently used to identify a communication method more optimized for receiving data, and communicate with a server by the identified communication method.

The metadata may refer, for example, to data including information regarding a plurality of types of data (e.g., volume of each data type, address or method for receiving each type of data, predefined level or priority order of each data type, and the like) which are able to be received by the processor 130 from the server for map streaming. Accordingly, the processor 130 may identify a plurality of types of data which are able to be received from the server through the metadata and receive the identified types of data from the server via the communicator 120. The metadata may be implemented in a form of a text file, but this is merely an example and the metadata may be implemented in a form of an image, a sound, and the like.

The plurality of types of data included in the metadata may be classified by a predefined priority order and level. For example, the plurality of types of data may be classified into a low level to a high level based on whether it is data essential for the autonomous driving, and may be classified into a low priority order to a high priority order based on whether it is data essential for the safe autonomous driving. In an embodiment, the plurality of types of data which are able to be received based on metadata may be classified as illustrated by way of example in Table 1.

TABLE 1

| | Priority order | | |
|---|---|---|---|
| Level | High | Middle | Low |
| Low level | General map (e.g., navigation map) | Fixed structure (e.g., bridge, mountain, or river) | Static structure (e.g., road, curb, or tree) |
| Middle level | Long-term dynamic structure (e.g., lane, road sign, or speed-limit sign) | Short-term dynamic structure (e.g., construction zone) | Attribute information (e.g., weather information, or occurrence of |

TABLE 1-continued

| | Priority order | | |
|---|---|---|---|
| Level | High | Middle | Low |
| High level | News (e.g., traffic information or gathering) | Region information (e.g., driving purpose-based region information) | accident) Media (e.g., customized content or 3D actual image) |

In Table 1, as the data goes from the high level to the low level, it may be classified as data essential for the autonomous driving, and as the data goes from the low priority order to high priority order, it may be classified as data essential for the safe autonomous driving.

Each of the plurality of types of data may be mapped with a score value according to importance. Referring to Table 1, the data regarding the general map is the most important data, and accordingly, it may be mapped with a highest score value. In addition, the data having the highest priority among the pieces of data at the middle level may be mapped with a higher score value, compared to the data having the lowest priority order among the pieces of data at the low level. However, this is merely an example, and the plurality of types of data included in the metadata, the method for classifying each type, and the method of matching the score may be changed according to user setting.

The processor 130 may determine at least one type of data among the plurality of types of data included in the metadata based on state information of the vehicle on which the electronic device 100 is mounted and the bandwidth of the at least one communication method through the HD map module 50. In other words, the processor 130 may determine a type of data to be preferentially received based on physical and spatial elements of the vehicle on which the electronic device 100 is mounted and a network state of the electronic device.

For example, the processor 130 may divide a surrounding area of the vehicle, on which the electronic device 100 is mounted, through the HD map module 50 by a predetermined method, and obtain a first score value of each of the divided surrounding areas based on the state information of the vehicle. For example, the processor 130 may divide the surrounding area of the vehicle into 4-direction areas (e.g., front area, rear area, right area, and left area of the vehicle). However, this is merely an example, and the processor 130 may divide the surrounding area of the vehicle into 8-direction areas and the like by various methods.

The processor 130 may obtain the first score value of each of the divided surrounding areas of the vehicle based on the state information of the vehicle including a speed of the vehicle and a direction angle of movement of the vehicle through the HD map module 50. The first score value may be a score value for identifying for which area, among the areas of the vehicle, data has to be preferentially obtained. In an embodiment, as the speed of the vehicle is high, the processor 130 may determine the first score value of the front area of the vehicle as a high value.

For example, if the speed of the vehicle is 80 km/h or higher, the area for which the data for map streaming is currently necessary for the vehicle may be the front area, and the data of the rear area may not be important. Accordingly, as the forward speed of the vehicle on which the electronic device 100 is mounted is high, the processor 130 may determine the first score value of the front area of the vehicle as a high value. In another example, if the speed of the vehicle is 20 km/h or lower, the data of the rear, or right and left areas may be important, compared to a case where the speed is 80 km/h. Accordingly, as the forward speed of the vehicle on which the electronic device 100 is mounted is low, the processor 130 may determine the first score value of the front area of the vehicle as a low value and determine the first score value of the left, right, or rear area as a high value.

In still another example, as an angle of a direction of movement of the vehicle is large, the processor 130 may determine the first score value of the area corresponding to the direction of the movement of the vehicle as a high value. For example, when the vehicle turns left, the area for which the data for map streaming is currently necessary for the vehicle may be the left area of the vehicle. Accordingly, when the vehicle turns left, the processor 130 may determine the first score value of the left area of the vehicle as a high value.

In addition, the processor 130 may determine the priority order of the surrounding areas of the vehicle according to the first score value through the HD map module 50. For example, when the first score value of the front area is the largest among the surrounding areas of the vehicle, the processor 130 may determine the priority order of the front area among the surrounding areas as the highest priority order. In addition, the processor 130 may determine the plurality of types of data included in the metadata corresponding to the surrounding area with the highest priority as the data to be received first through the HD map module 50. In other words, the processor 130 may identify the area most necessary for the map streaming among the surrounding areas of the vehicle based on the state of the vehicle, and determine the plurality of types of data included in metadata corresponding to the identified area as data to be preferentially received.

In an embodiment of the disclosure, the processor 130 may determine an amount of the plurality of types of data to be received which are included in the metadata corresponding to each area, in proportion to the first score value of each area. In other words, the processor 130 may not only determine the area for which data is to be preferentially received based on the priority order of each area of the vehicle identified through the first score value, but also determine the area for which data is to be preferentially received based on the first score value of each area. An example of this will be described in greater detail below with reference to FIGS. 2A and 2B.

The processor 130 may obtain a second score value based on the bandwidth of the at least one communication method through the HD map module 50. The second score value may be a score value for identifying which type of data, among the plurality of types of data included in the metadata, is data to be preferentially received. Specifically, the processor 130 may determine data to be preferentially received based on the second score value among the plurality of types of data included in the metadata corresponding to the area with the highest priority.

The processor 130 may determine the area for which the data is to be preferentially received among the areas of the vehicle based on the state information of the vehicle, and then determine the data to be preferentially received among the plurality of types of data included in the metadata corresponding to the determined area based on a network state of the vehicle. However, this is merely an example, and the processor 130 may determine the data to be preferentially received among the plurality of types of data and then determine the area for which the data is to be preferentially received among the areas of the vehicle.

The processor 130 may obtain the second score value according to the bandwidth of the communication method for communicating with the at least one server. For example, as the bandwidth of the method for communicating with the at least one server is great, the processor 130 may obtain a great second score value. Accordingly, in a case of communicating with the server with a great bandwidth through multi-connected method, the processor 130 may obtain a great second score value.

In addition, the processor 130 may determine data mapped with a score value which is the second score value or lower among the plurality of types of data, as the data to be received from the server. As described above with reference to Table 1, each of the plurality of types of data included in the metadata may be mapped with the score value according to importance. For example, referring to Table 1, when a score value of data regarding a fixed structure with the middle priority order at the low level is 2 and a score value of data regarding general map with the high priority order at the low level is 1, if the second score value is 2, the processor 130 may determine the data regarding the fixed structure and the general map as the data to be received from the server.

In addition, the processor 130 may receive and provide at least one type of data determined to be received from the server, from the server via the communicator 120. Since the processor 130 selectively receives and provides (or streams) the plurality of types of data according to a network environment and a driving environment of the vehicle, QoE of real-time properties essential for safe driving and reliability regarding underrun occurring due to failure of receiving various data may be compensated.

In addition, in an example, the processor 130 may control the display 140 to display a screen obtained by combining the received at least one type of data. In another example, if the data received from the server is traffic news in a form of voice, the processor 130 may output the traffic news as a voice. This will be described in greater detail below with reference to FIG. 5.

In an embodiment of the disclosure, when a destination of the vehicle is determined, the processor 130 may receive information regarding a shadowing area present in a route from a starting point to the destination from the server via the communicator 120 based on the at least one communication method. In another example, the processor 130 may analyze a bandwidth map of a telecommunications operator providing a communication method for connecting to a server through the network shadowing analyzing module 30 to obtain information regarding the shadowing area present in the route from the starting point to the destination. In still another example, the processor 130 may receive information regarding a surrounding shadowing area among shared information obtained by each vehicle from a vehicle travelling in front or at the back of the vehicle on which the electronic device 100 is mounted via the communicator 120. The shadowing area may refer, for example, to an area where a wave (light, radio wave, or the like) is absorbed, blocked, or attenuated due to an obstruction such as surrounding structure or the like.

In an embodiment, the processor 130 may identify whether an idle bandwidth is present by monitoring a bandwidth of a method for communicating with the server through the network monitoring module 20. For example, the processor 130 may measure an available bandwidth of a method for currently communicating with the server. In addition, the processor 130 may identify whether an idle bandwidth currently not used is present in the available bandwidth. When it is identified that the idle bandwidth is present, the processor 130 may obtain data of the shadowing area present in the route from the starting point to the destination of the vehicle (e.g., map data of the shadowing area and the surrounding of the shadowing area, and the like) in advance from the server via the communicator 120 using the idle bandwidth through the pre-fetching module 40. In addition, when the vehicle on which the electronic device 100 is mounted has arrived the shadowing area, the processor 130 may provide the data of the shadowing area obtained in advance to reduce a change of quality strong for the change of the network environment even in the shadowing area, provide high-quality data, and reduce buffering.

In another example of the disclosure, when it is identified that the idle bandwidth is present, the processor 130 may receive data regarding a route predicted that the vehicle will move through from the server using the idle bandwidth via the communicator 120. In other words, the processor 130 may obtain map data regarding not only the shadowing area, but also the route predicted that the vehicle will move through, through the identified idle bandwidth. When the vehicle passes through the route corresponding to the received data, the processor 130 may obtain map data regarding other areas of the route in advance at the same time as the providing of the received data or within threshold time. The processor 130 may utilize the idle bandwidth by the multi-connected or multi-path method via the communicator 120. For example, when the idle bandwidth is identified while data is received from a first server through the Wi-Fi module using a specific bandwidth, the processor 130 may select a communication method for using the identified idle bandwidth based on at least one of the bandwidth and the speed of each communication method and the cost of each communication method. When the LTE-A is selected as the communication method for using the idle bandwidth, the processor 130 may receive data from the first server in parallel through the LTE-A module using the identified idle bandwidth, while receiving data from the first server through the Wi-Fi module using the specific bandwidth. In another example, when the LTE-A is selected by the communication method for using the idle bandwidth, the processor 130 may receive data from a second server in parallel through the LTE-A module using the identified idle bandwidth while receiving data from the first server through the Wi-Fi module using the specific bandwidth.

The processor 130 may include various processing circuitry, including, for example, and without limitation, one or more of a central processing unit (CPU), a microcontroller unit (MCU), a microprocessing unit (MPU), a controller, an application processor (AP), or a communication processor (CP), an ARM processor or the like, or may be defined as the corresponding term. In addition, the processor 130 may be implemented as System on Chip (SoC) or large scale integration (LSI) including the processing algorithm or may be implemented in form of a field programmable gate array (FPGA). The processor 130 may perform various functions by executing computer executable instructions stored in the memory 110. In addition, the processor 130 may include at least one of a graphics processing unit (GPU), a neural processing unit (NPU), and a visual processing unit (VPU) which are separate AI dedicated processors, in order to perform an artificial intelligence function.

Figure 2A:
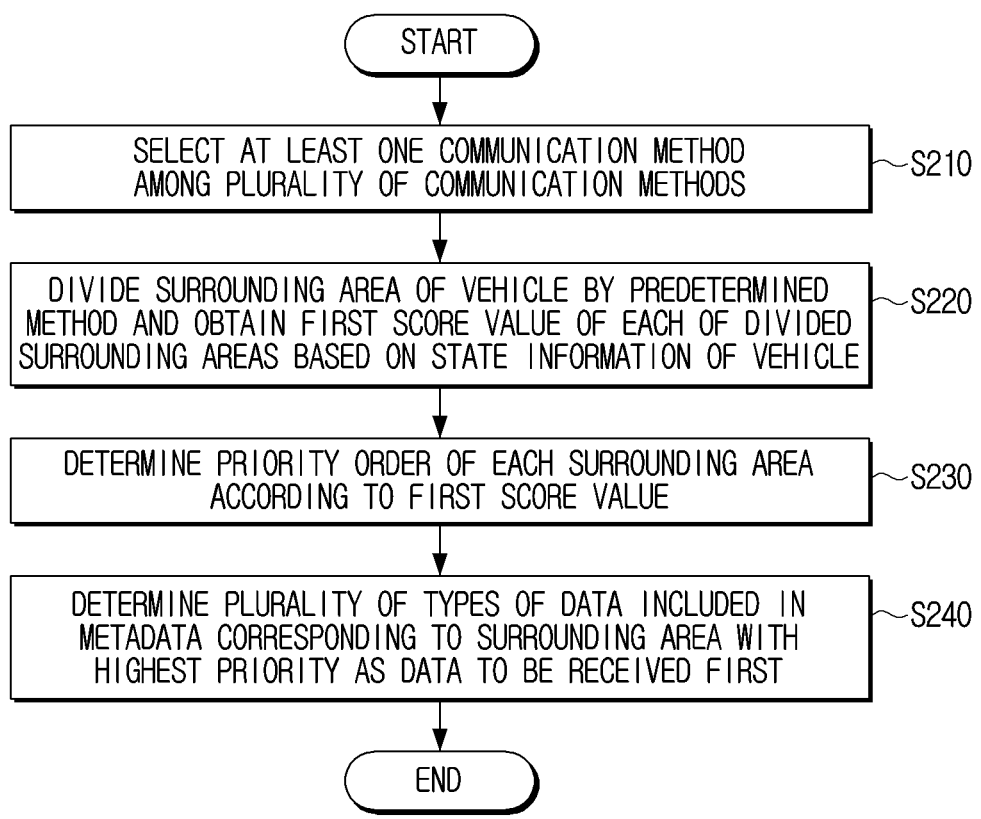
FIG. 2A is a flowchart illustrating an example process in which an electronic device determines a priority order of surrounding areas according to various embodiments.
Figure 2B:
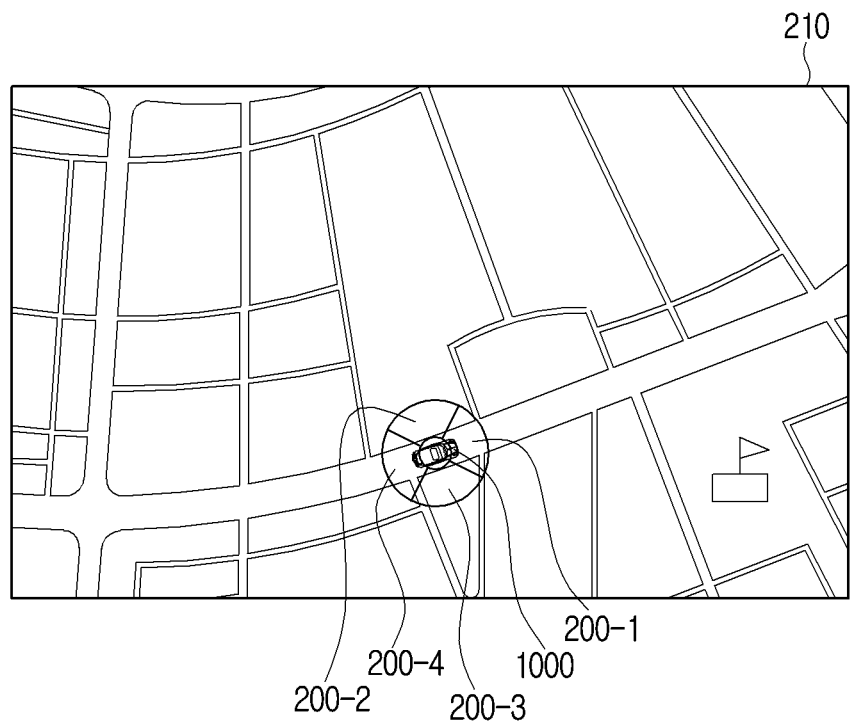
FIG. 2B is a diagram illustrating an example process in which an electronic device determines a priority order of surrounding areas according to various embodiments.

FIGS. 2A and 2B are a flowchart and a diagram, respectively, illustrating an example process in which an electronic device determines a priority order of surrounding areas according to various embodiments. The electronic device 100 may select at least one communication method among a plurality of communication methods (S210). The process in which the electronic device 100 selects the communication method has been described in detail above with reference to FIG. 1, and therefore the overlapped description may not be repeated.

The electronic device 100 may divide a surrounding area of a vehicle 1000 by a predetermined method and obtain a first score value of each of the divided surrounding areas based on state information of the vehicle 1000 (S220). Referring to FIG. 2B, the electronic device 100 may divide the surrounding area of the vehicle 1000 on which the electronic device 100 is mounted into 4-direction areas (e.g., front area 200-1, left and right areas 200-2 and 200-3, and rear area 200-4 of the vehicle). This is merely an example and the electronic device 100 may divide the surrounding area of the vehicle 1000 by various methods for dividing the surrounding area into 8-direction areas, and the like. The electronic device 100 may obtain a first score value of each of the divided areas based on a speed of the vehicle 1000 and a direction angle of movement of the vehicle.

For example, when the vehicle 1000 is moving forward at a speed of 100 km/h, the information of the area most necessary for the vehicle 1000 for the map streaming may be the front area 200-1 of the vehicle 1000. Accordingly, when the vehicle 1000 is moving forward at a speed of 100 km/h, the first score value of the front area 200-1 may be a value higher than the first score values of the other areas. In another example, when the vehicle 1000 is turning left, the information of the area most necessary for the vehicle 1000 for the map streaming may be the left area 200-2 of the vehicle 1000. Accordingly, when the vehicle is turning left, the first score value of the left area 200-2 may be a value higher than the first score values of the other areas.

In addition, the electronic device 100 may determine a priority order of each surrounding area according to the first score value (S230). If the first score value of the specific area is great, the electronic device 100 may determine a priority order of a specific area as a high priority order. For example, if the vehicle 1000 is moving forward at a speed of 100 km/h, the electronic device 100 may determine the priority order of the front area 200-1 as a first priority, the priority order of the left and right areas 200-2 and 200-3 as a second priority, and the priority order of the rear area 200-4 as a fourth priority.

In addition, the electronic device 100 may determine the plurality of types of data included in metadata corresponding to the surrounding area with the highest priority as the data to be received first (S240). For example, when the priority order of the front area 200-1 is determined as the first priority, the electronic device 100 may determine the plurality of types of data included in metadata corresponding to the front area 200-1 among the metadata received form the server as the data to be received first from the server.

In an embodiment of the disclosure, the electronic device 100 may determine an amount of the plurality of types of data to be received which are included in the metadata corresponding to each area, in proportion to the first score value of each area. For example, if the first score value of the front area 200-1 is 8, the first score value of each of the left and right areas 200-2 and 200-3 is 1, and the first score value of the rear area 200-4 is 0, the electronic device 100 may determine to receive data included in the metadata corresponding to the front area 200-1 by 80% and receive each of data included in the metadata corresponding to the left and right areas by 10%, respectively.

Figure 3:
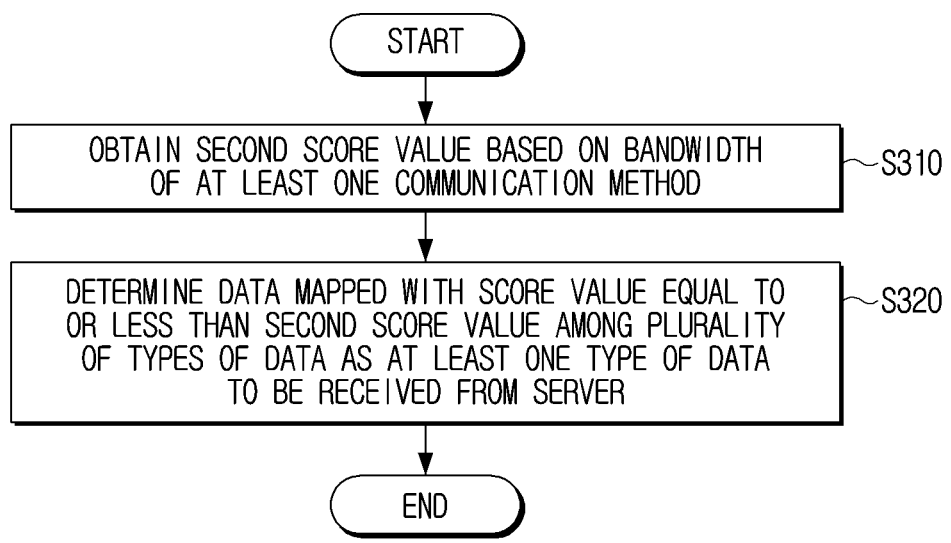
FIG. 3 is a flowchart illustrating an example process in which an electronic device determines at least one piece of data to be received from a server according to various embodiments.

FIG. 3 is a flowchart illustrating an example process in which the electronic device 100 determines at least one piece of data to be received from at least one server according to various embodiments. The electronic device 100 may obtain a second score based on a bandwidth of the at least one communication method (S310). As illustrated above with reference to FIGS. 2A and 2B, the electronic device 100 may determine an area for which the data is to be preferentially received among the surrounding areas of the vehicle, and obtain a second score for determining a type of data to be preferentially received among a plurality of types of data included in metadata corresponding to the determined area. This is merely an example, and the electronic device 100 may determine a type of data to be preferentially received among the plurality of types of data by obtaining the second score and then determine an area for which the data is to be preferentially received among the surrounding areas of the vehicle. The electronic device 100 may obtain the second score value according to the bandwidth of the communication method connected to the server. In an embodiment, as the bandwidth of the communication method connected to the server is great, the electronic device 100 may obtain a high second score value.

In addition, the electronic device 100 may determine data mapped with a score value equal to or less than the second score value among the plurality of types of data as the data to be received from the server (S320). For example, each of the plurality of types of data included in the metadata may be mapped with the score value according to importance. If the plurality of types of data included in the metadata is mapped with the score value according to the importance as in Table 1, the electronic device 100 may determine the obtained type of data equal to or less than the second score value among the plurality of types of data as the data to be received from the server.

Figure 4A:
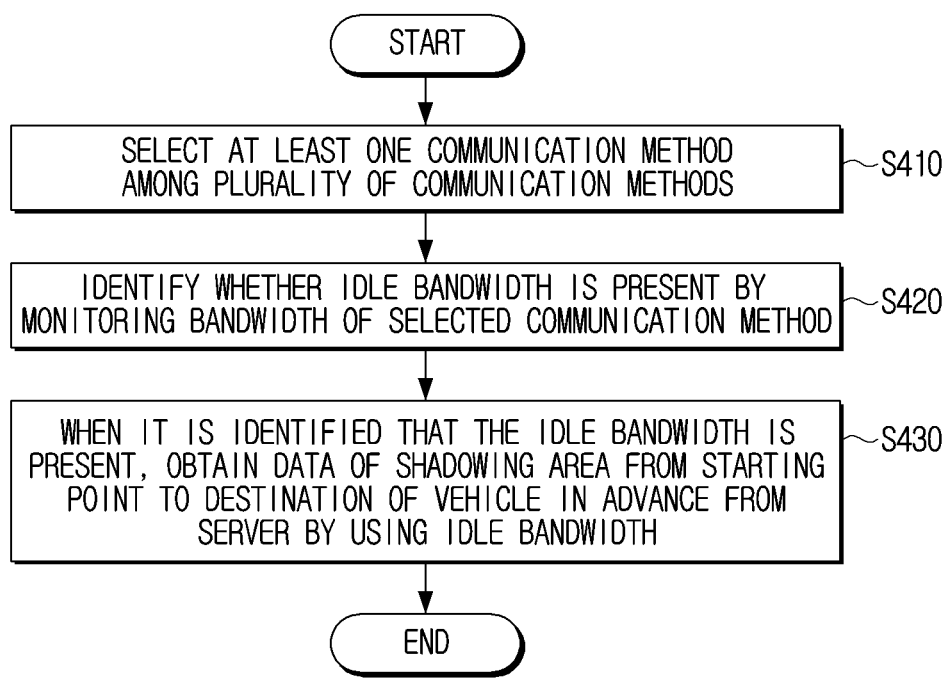
FIG. 4A is a flowchart illustrating an example process in which an electronic device obtains data of a shadowing area using an idle bandwidth according to various embodiments.
Figure 4B:
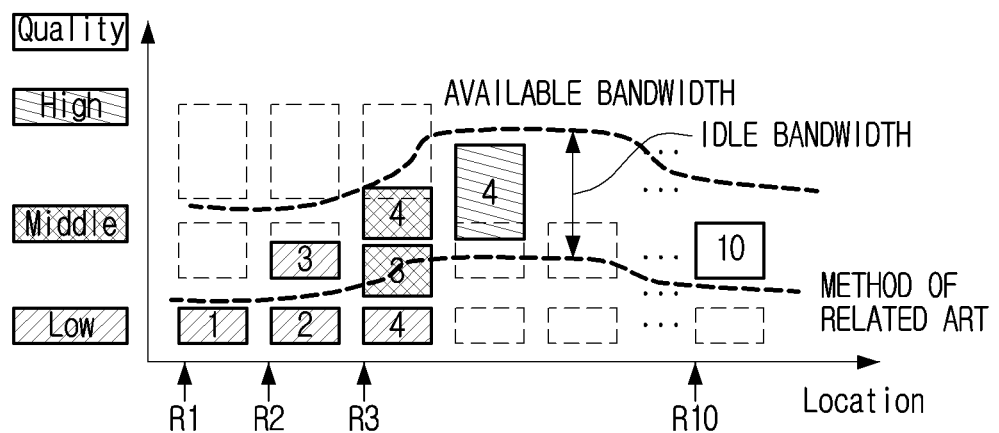
FIG. 4B is a diagram illustrating an example process in which an electronic device obtains data using an idle bandwidth in advance according to various embodiments.

FIGS. 4A and 4B are a flowchart and a diagram, respectively, illustrating an example process in which the electronic device 100 obtains data using an idle bandwidth in advance according to various embodiments. The electronic device 100 may select at least one communication method among the plurality of communication methods (S410). The process in which the electronic device 100 selects at least one method of the plurality of communication methods has been described in detail above with reference to FIG. 1, and therefore the overlapped description may not be repeated.

The electronic device 100 may identify whether the idle bandwidth is present by monitoring the bandwidth of the selected communication method (S420). For example, the electronic device 100 may measure an available bandwidth by monitoring a bandwidth of the selected at least one communication method in real time, while communicating with the server by multi-path or multi-connected method using the selected at least one communication method. The electronic device 100 may measure the available bandwidth through packet monitoring of a difference in time of receiving between packets received from the server, a round trip time (RTT), and the like. The electronic device 100 may identify whether the idle bandwidth which is a difference between the available bandwidth and the bandwidth of the communication method currently used is present.

In addition, when it is identified that the idle bandwidth is present, the electronic device 100 may obtain data of the shadowing area from the starting point to the destination of the vehicle in advance from the at least one server using the idle bandwidth (S430). For example, the electronic device 100 may obtain map data or the like regarding the shadowing area where the vehicle has not currently arrived, in advance using the idle bandwidth. Accordingly, the electronic device 100 may provide high-quality map data without buffering by providing the map data regarding the shadowing area received in advance when the vehicle has arrived the shadowing area.

The electronic device 100 may receive data regarding a route predicted that the vehicle will move through, in advance from the server using the idle bandwidth. For example, referring to FIG. 4B, in the related art, the electronic device 100 may receive data from the server using only the bandwidth of the communication method connected to the server. However, the electronic device 100 according to the disclosure may identify whether the idle bandwidth is present by measuring the available bandwidth and receive more data from the server using the idle bandwidth. For example, in the related art, as the location moves from R1 to R2, the electronic device 100 may receive data Nos. 1 and 2 corresponding to each location of R1 and R2 from the server using the communication method connected to the server. The electronic device 100 of the disclosure may obtain not only the data Nos. 1 and 2, but also data No. 3 corresponding to a location of R3, using the idle bandwidth while moving from R1 to R2. In other words, the electronic device 100 may receive data regarding a route predicted that the vehicle will move through, in advance from the server using the idle bandwidth and provide the received data when the vehicle passes through the route corresponding to the received data.

Figure 5:
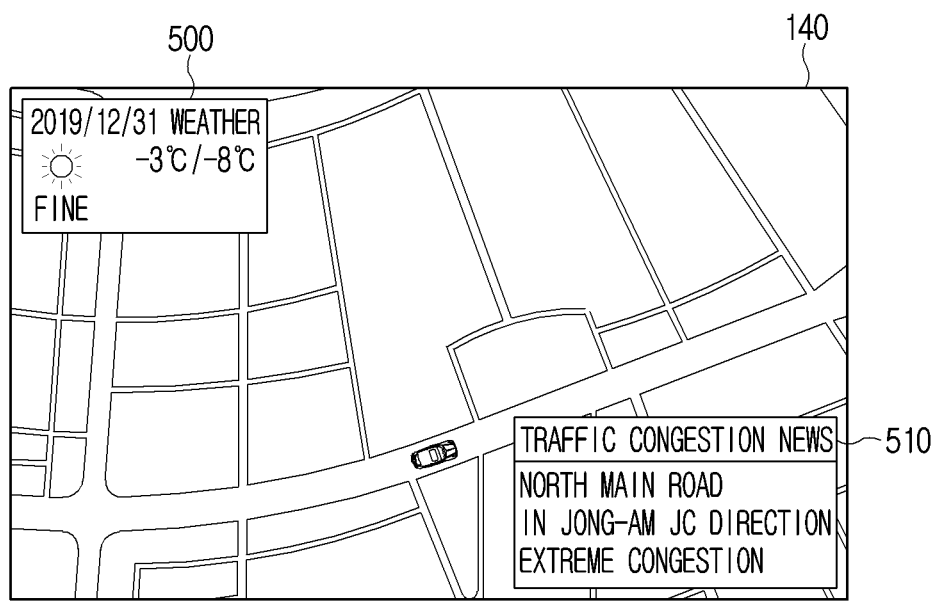
FIG. 5 is a diagram illustrating an example screen obtained by combining at least one type of data displayed by an electronic device according to various embodiments.

FIG. 5 is a diagram illustrating an example process in which the electronic device 100 displays a screen obtained by combining at least one type of data according to various embodiments. When data regarding a general map and situation data of the map (e.g., weather information, information regarding accident or traffic congestion) are received among the plurality of types of data included in the metadata, the electronic device 100 may display a screen obtained by combining each received data.

For example, the electronic device 100 may display the general map on the entire display 140 and display weather information 500 and traffic congestion information 510 in one area of the general map. FIG. 5 is merely an example and the area where the weather information 500 and the traffic congestion information 510 are disposed may be freely changed by user setting.

When the plurality of types of data included in the metadata includes news data and the like provided as a voice, the electronic device 100 may output the news data as a voice while displaying the general map.

Figure 6:
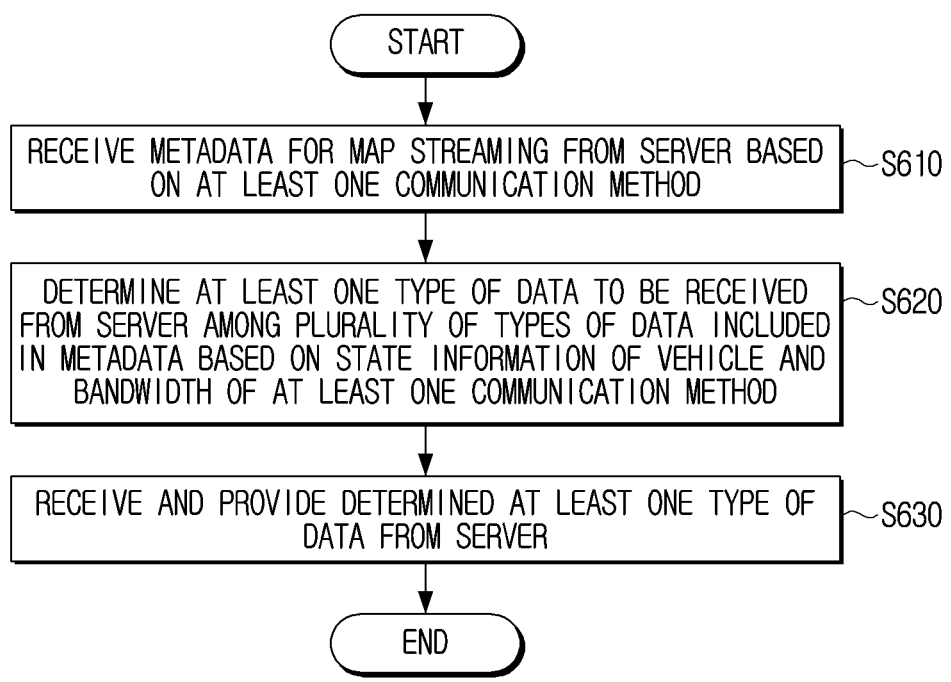
FIG. 6 is a flowchart illustrating an example method for controlling an electronic device according to various embodiments.

FIG. 6 is a flowchart illustrating an example method for controlling the electronic device 100 according to various embodiments.

The electronic device 100 may receive metadata for map streaming from at least one server based on at least one communication method (S610). For example, when a destination of the vehicle on which the electronic device 100 is mounted is determined, the electronic device 100 may select at least one communication method based on at least one of a bandwidth and a speed of each communication method and a cost of each communication method among the plurality of communication methods. The electronic device 100 may communicate with the at least one server by the multi-connected or multi-path method using the selected at least one communication method and receive the metadata for map streaming.

The electronic device 100 may determine at least one type of data to be received from the at least one server among the plurality of types of data included in the metadata based on state information of the vehicle and the bandwidth of the at least one communication method (S620). In other words, the electronic device 100 may determine a type of data to be preferentially received from the at least one server based on a network state of the electronic device 100 mounted on the vehicle and physical information of the vehicle. For example, the electronic device 100 may determine an area for which data is to be preferentially received, among areas of the vehicle based on a speed of the vehicle and a direction angle of movement of the vehicle. The electronic device 100 may determine a type of data to be preferentially received, among the plurality of types of data included in the metadata based on the bandwidth of the communication method.

When the destination of the vehicle is determined, the electronic device 100 may identify whether the idle bandwidth is present by monitoring the bandwidth of the at least one communication method. For example, the electronic device 100 may identify whether the idle bandwidth is present by measuring the available bandwidth of the communication method currently being connected to the server. In addition, the electronic device 100 may receive data regarding a shadowing area present in a route from a starting point to the destination or data regarding a route predicted that the vehicle will move through, in advance from the server using the idle bandwidth.

The electronic device 100 may receive and provide the determined at least one type of data from the at least one server (S630). The electronic device 100 may display a screen obtained by combining the received at least one type of data.

Figure 7:
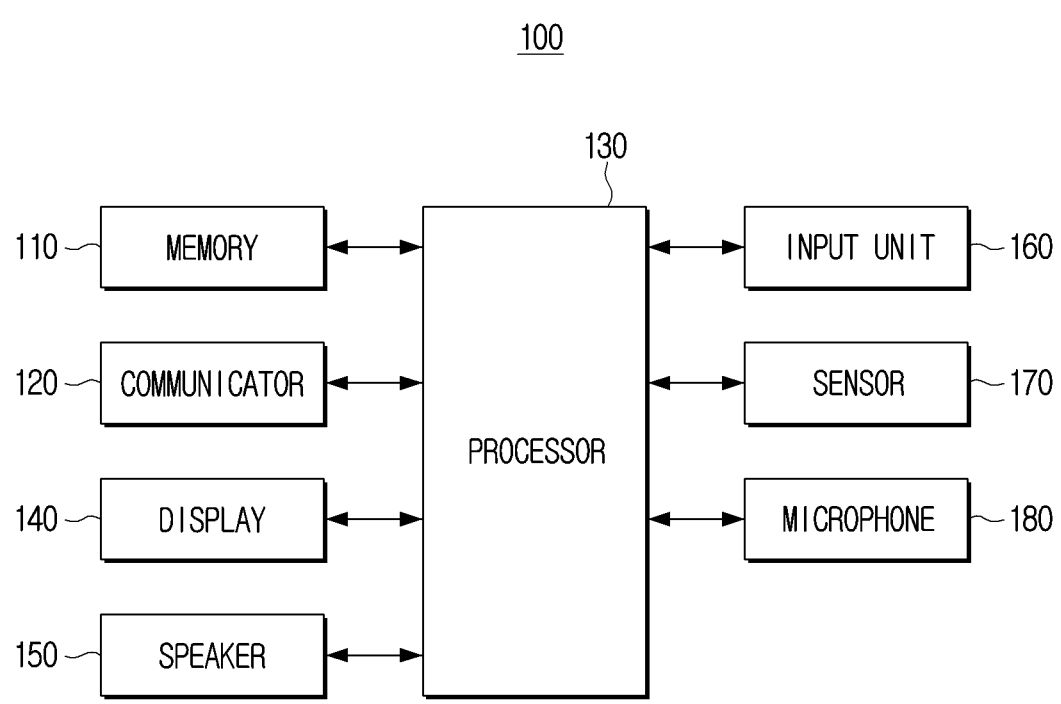
FIG. 7 is a block diagram illustrating an example configuration of an electronic device according to various embodiments.

FIG. 7 is a block diagram illustrating an example configuration of the electronic device 100 according to an embodiment. Referring to FIG. 7, the electronic device 100 may include the memory 110, the communicator (e.g., including communication circuitry) 120, the processor (e.g., including processing circuitry) 130, the display 140, a speaker 150, an input interface or input unit (e.g., including input interface circuitry) 160, a sensor 170, and a microphone 180. The memory 110, the communicator 120, and the processor 130 have been described in detail above with reference to FIG. 1, and therefore the overlapped description may not be repeated.

The display 140 may display various pieces of information under the control of the processor 130. For example, the display 140 may display a screen obtained by combining at least one type of data. The display 140 may, for example, be implemented as a touch screen with a touch panel.

The speaker 150 may output not only various pieces of audio data obtained by executing various processing such as decoding, amplification, or noise filtering by an audio processor, but also various alerts or voice messages. For example, if the data received from the server is news data or the like in a form of a voice, the speaker 150 may output the news data or the like as a voice under the control of the processor 130. The element for outputting audio data may be implemented as a speaker, but this is merely an example, and the element may be implemented as an output terminal capable of outputting audio data.

The input interface 160 (or, input unit) may include various input circuitry and receive a user input for controlling the electronic device 100. For example, the input interface 160 may include a touch panel for receiving a user's touch using a user's finger or a stylus pen, a button for receiving user manipulation, and the like. In addition, input interface 160 may be implemented as other input devices (e.g., keyboard, mouse, motion input unit, and the like).

The sensor 170 may detect various pieces of state information of the electronic device 100. For example, the sensor 170 may include a sensor for detecting position information of the electronic device 100 (e.g., global positioning system (GPS) sensor), a sensor for detecting environment information around the vehicle on which the electronic device 100 is mounted (e.g., temperature sensor, humidity sensor, atmospheric pressure sensor, or the like), a sensor for detecting user information of the electronic device 100 (e.g., blood pressure sensor, blood sugar sensor, a pulse sensor, or the like), a sensor for detecting presence of a user (e.g., camera, UWB sensor, IR sensor, proximity sensor, optical sensor, or the like), and the like. In addition, the sensor 170 may further include an image sensor for capturing the outside of the vehicle on which the electronic device 100 is mounted.

The microphone 180 may be an element for receiving a user voice. The microphone 180 may transmit the received user voice to the processor 130. In addition, when the memory 110 stores a dialogue system which is an artificial intelligence model for providing a response to the user voice, the microphone 180 may input the input user voice to the dialogue system under the control of the processor 130. Then, the processor 130 may perform a specific operation based on a result output by the dialogue system.

According to the various embodiments of the disclosure, the electronic device selectively receives data for map streaming according to the network environment and the driving environment of the vehicle, and accordingly, the user may receive data ensuring high quality, less delay, and quality of experience (QoE) and more efficiently use the autonomous driving vehicle.

It should be noted that the accompanying drawings in the disclosure do not limit the technologies disclosed in this disclosure to any specific embodiment, but they should be interpreted to include all modifications, equivalents and/or alternatives of the embodiments of the disclosure. In relation to explanation of the drawings, similar reference numerals may be used for similar elements.

In this disclosure, the terms such as "comprise", "may comprise", "consist of", or "may consist of" are used herein to designate a presence of corresponding features (e.g., elements such as number, function, operation, or part), and not to preclude a presence of additional features.

In this disclosure, expressions such as "A or B", "at least one of A [and/or] B,", or "one or more of A [and/or] B," include all possible combinations of the listed items. For example, "A or B", "at least one of A and B,", or "at least one of A or B" includes any of (1) at least one A, (2) at least one B, or (3) at least one A and at least one B.

The expressions "first," "second" and the like used in the disclosure may denote various elements, regardless of order and/or importance, and may be used to distinguish one element from another, and does not limit the elements.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. The expression "configured to" does not necessarily refer to a device being "specifically designed to" in terms of hardware. Instead, under some circumstances, the expression "a device configured to" may refer to the device being "capable of" performing an operation together with another device or component. For example, the phrase "a unit or a processor configured (or set) to perform A, B, and C" may refer, for example, and without limitation, to a dedicated processor (e.g., an embedded processor) for performing the corresponding operations, a generic-purpose processor (e.g., a central processing unit (CPU) or an application processor), or the like, that can perform the corresponding operations by executing one or more software programs stored in a memory device.

The term "user" may refer to a person using an electronic device or a device (e.g., an artificial intelligence electronic device) using an electronic device.

In this disclosure, the term "unit" or "module" may include a unit implemented with hardware, software, or firmware, or any combination thereof, and may be interchangeably used with terms, for example, logic, logic blocks, parts, or circuits. The "unit" or the "module" may be a part integrally formed or a minimum unit or a part of the part performing one or more functions. For example, the module may be implemented as an application-specific integrated circuit (ASIC).

Various embodiments of the disclosure may be implemented as software including instructions stored in machine (e.g., computer)-readable storage media. The machine is a device which invokes instructions stored in the storage medium and is operated according to the invoked instructions, and may include an electronic device (e.g., electronic device 100) according to the disclosed embodiments. In a case where the instruction is executed by a processor, the processor may perform a function corresponding to the instruction directly or using other elements under the control of the processor. The instruction may include a code made by a compiler or a code executable by an interpreter. The machine-readable storage medium may be provided in a form of a non-transitory storage medium. Here, the "non-transitory" storage medium is tangible and may not include signals, and it does not distinguish that data is semi-permanently or temporarily stored in the storage medium. For example, the "non-transitory storage medium" may include a buffer temporarily storing data.

According to an embodiment, the methods according to various embodiments disclosed in this disclosure may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of the on-line distribution, at least a part of the computer program product may be at least temporarily stored or temporarily generated in a storage medium such as a memory of a server of a manufacturer, a server of an application store, or a relay server.

Each of the elements (e.g., a module or a program) according to various embodiments described above may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration. Operations performed by a module, a program, or other elements, in accordance with various embodiments, may be performed sequentially, in a parallel, repetitive, or heuristically manner, or at least some operations may be performed in a different order, omitted, or may add a different operation.

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents.

What is claimed is:

1. An electronic device mountable on an autonomous driving vehicle, the device comprising:
    a communicator comprising circuitry;
    a memory; and
    a processor configured to control the electronic device to:
    receive metadata for map streaming from at least one server via the communicator based on at least one communication method,
    determine at least one type of data to be received from the at least one server among a plurality of types of data included in the metadata based on state information of the vehicle and a bandwidth of the at least one communication method, and
    receive and provide the determined at least one type of data from the at least one server via the communicator.

2. The device according to claim 1, wherein the processor is configured to:
    select the at least one communication method based on at least one of the bandwidth and a speed of each communication method, and a cost of each communication method among a plurality of communication methods; and
    control the electronic device to receive the metadata for the map streaming from the at least one server by a multi-connected or multi-path method using the selected at least one communication method via the communicator.

3. The device according to claim 1, wherein the processor is configured to:
    divide a surrounding area of the vehicle by a predetermined method and obtain a first score value of each of the divided surrounding areas based on state information of the vehicle; and
    determine a priority order of each surrounding area based on the first score value.

4. The device according to claim 3, wherein the state information of the vehicle comprises a speed of the vehicle and a direction angle of movement of the vehicle,
    wherein, as the speed of the vehicle increases, the first score value of a front area of the vehicle increases, and
    wherein, as the direction angle of the movement of the vehicle increases, the first score value of an area corresponding to a direction of the movement of the vehicle increases.

5. The device according to claim 3, wherein the processor is configured to:
    determine the priority order of the surrounding area based on the first score value, and
    determine a plurality of types of data included in metadata corresponding to a surrounding area with a highest priority as data to be received first.

6. The device according to claim 1, wherein each of the plurality of types of data included in the metadata is mapped with a score value based on importance, and
    wherein the processor is configured to:
    obtain a second score value based on the bandwidth of the at least one communication method, and
    determine data mapped with a score value equal to or less than the second score value among the plurality of types of data as the at least one type of data.

7. The device according to claim 1, wherein the processor is configured to control the electronic device to receive information regarding a shadowing area present on a route from a starting point to a destination of the vehicle from the at least one server via the communicator based on the at least one communication method.

8. The device according to claim 1, wherein the processor is configured to:
    identify whether an idle bandwidth is present by monitoring the bandwidth of the at least one communication method; and
    based on the idle bandwidth being identified to be present, obtain data of a shadowing area present on a route from a starting point to a destination of the vehicle in advance from the at least one server via the communicator using the idle bandwidth.

9. The device according to claim 8, wherein the processor is configured to control the electronic device to:
    based on the idle bandwidth being identified to be present, receive data regarding a route predicted that the vehicle will move through in advance from the at least one server via the communicator using the idle bandwidth; and
    provide the received data based on the vehicle passing through a route corresponding to the received data.

10. The device according to claim 1, further comprising:
    a display,
    wherein the processor is configured to control the display to display a screen obtained by combining the received at least one type of data.

11. A method for controlling an electronic device mountable on an autonomous driving vehicle, the method comprising:
    receiving metadata for map streaming from at least one server based on at least one communication method;
    determining at least one type of data to be received from the at least one server among a plurality of types of data included in the metadata based on state information of the vehicle and a bandwidth of the at least one communication method; and
    receiving and providing the determined at least one type of data from the at least one server.

12. The method according to claim 11, wherein the receiving comprises:
    selecting the at least one communication method based on at least one of the bandwidth and a speed of each communication method, and a cost of each communication method among a plurality of communication methods; and
    receiving the metadata for the map streaming from the at least one server by a multi-connected or multi-path method using the selected at least one communication method.

13. The method according to claim 11, wherein the determining comprises:

dividing a surrounding area of the vehicle by a predetermined method and obtaining a first score value of each of the divided surrounding areas based on state information of the vehicle; and determining a priority order of each surrounding area based on the first score value.

14. The method according to claim 13, wherein the state information of the vehicle comprises a speed of the vehicle and a direction angle of movement of the vehicle, wherein, as the speed of the vehicle increases, the first score value of a front area of the vehicle increases, and wherein, as the direction angle of the movement of the vehicle increases, the first score value of an area corresponding to a direction of the movement of the vehicle increases.

15. The method according to claim 13, wherein the determining priority order comprises:

determining the priority order of the surrounding area based on the first score value; and determining a plurality of types of data included in metadata corresponding to a surrounding area with a highest priority as data to be received first.

16. The method according to claim 11, wherein each of the plurality of types of data included in the metadata is mapped with a score value based on importance, and wherein the determining comprises:

obtaining a second score value based on the bandwidth of the at least one communication method; and determining data mapped with a score value equal to or less than the second score value among the plurality of types of data as the at least one type of data.

17. The method according to claim 11, wherein the receiving comprises receiving information regarding a shadowing area present on a route from a starting point to a destination of the vehicle from the at least one server based on the at least one communication method.

18. The method according to claim 11, wherein the receiving comprises:

identifying whether an idle bandwidth is present by monitoring the bandwidth of the at least one communication method; and based on the idle bandwidth being identified to be present, obtaining data of a shadowing area present on a route from a starting point to a destination of the vehicle in advance from the at least one server using the idle bandwidth.

19. The method according to claim 18, wherein the identifying comprises:

based on the idle bandwidth being identified to be present, receiving data regarding a route predicted that the vehicle will move through in advance from the at least one server using the idle bandwidth; and providing the received data when the vehicle passes through a route corresponding to the received data.

20. The method according to claim 11, wherein the receiving and providing comprises displaying a screen obtained by combining the received at least one type of data.

* * * * *